United States Patent
Friedrich

[15] 3,669,877
[45] June 13, 1972

[54] MULTI-CHAMBER FLUIDIZED BED CATALYTIC REACTOR

[72] Inventor: Heinz G. Friedrich, Houston, Tex.

[73] Assignee: Petro-Tex Chemical Corporation, Houston, Tex.

[22] Filed: Feb. 5, 1970

[21] Appl. No.: 8,834

[52] U.S. Cl. ..............................208/164, 23/1 F, 23/1 FT, 23/288 S, 252/417, 260/683.3
[51] Int. Cl. ....................B01j 9/20, B01j 11/04, C10g 13/18
[58] Field of Search......................260/683.3; 208/164, 163; 23/288 S, 284, 1 F, 1 FT; 252/417

[56] References Cited

UNITED STATES PATENTS

| | | | |
|---|---|---|---|
| 2,468,508 | 4/1949 | Munday | 23/288 S X |
| 2,477,751 | 8/1949 | Johnson | 23/288 S |
| 2,631,090 | 3/1953 | Palmer | 23/288 S |
| 2,965,454 | 12/1960 | Harper | 23/288 S |
| 2,985,515 | 5/1961 | McKinley | 23/288 S X |
| 2,464,812 | 3/1949 | Johnson | 23/288 S X |
| 2,527,198 | 10/1950 | Rollman | 23/288 S X |
| 2,895,906 | 7/1959 | Harper | 23/288 S X |
| 2,631,927 | 3/1953 | Trainer et al. | 23/288 S |
| 2,650,155 | 8/1953 | Medlin | 23/288 S |
| 2,865,846 | 12/1958 | Degnen | 252/417 X |

Primary Examiner—Joseph Scovronek
Attorney—G. Baxter Dunaway

[57] ABSTRACT

A fluidized bed reactor, vertically divided into two or more upper compartments or chambers which are connected to each other by a lower mixing chamber, provides a fluidized bed system wherein the fluidized catalyst can be used in one of the upper chambers and then by random movement pass into the lower mixing chamber hence into another upper chamber where it can be regenerated. This compact system requires a minimum of equipment and gives a maximum of operating efficiency.

3 Claims, 4 Drawing Figures

Heinz G. Friedrich
INVENTOR

BY Kenneth W. Johnson
ATTORNEY

Heinz G. Friedrich
INVENTOR.

3,669,877

MULTI-CHAMBER FLUIDIZED BED CATALYTIC REACTOR

BACKGROUND OF THE INVENTION

The present invention relates to an apparatus for carrying out fluidized bed catalytic reactions and the method of operating therein. More particularly it relates to a fluidized bed reactor containing a a plurality of chambers or sections wherein each chamber or section is connected to the other chambers or sections in the bottom portion of the reactor but separated therefrom in the upper portion of the reactor.

The catalysts used in fluidized bed reactions are usually of a type that is regenerable, i.e., the catalyst is used and regenerated or reactivated continually. The reactivation is usually achieved by passing the used or spent catalyst from the reactor to a separate regenerator. In the regenerator the catalyst can be subjected to any number of treatments which will restore, at least in part, the original activity of the catalyst.

It is an object of the present invention to provide an apparatus for a continuous process that is more economical than both fixed bed and conventional circulating fluidized bed operations. It is another object of the invention to provide an apparatus that requires simpler operating techniques and less equipment than either fixed bed or conventional circulating fluidized bed reactors. These and other objects will become apparent from the description below.

Fluidized catalytic theory and technique are well known and no discussion is necessary here other than to point out that such theory and techniques are employed in the operation of the present apparatus, however, with certain advantages over conventional circulating fluidized bed apparatus and processes. The present apparatus is comprised of only one reactor, that is reaction, regeneration, activation, pretreatment, etc. are all carried out in the same piece of equipment. Thus there is an initial saving in equipment cost and space requirements, and a considerable reduction in piping since transfer lines to move the catalyst from zone to zone are not necessary. The use of a single reactor also simplifies the operating technique, thus the control equipment can be simpler and less extensive. Indeed, the simplified operation allows less skilled technical personnel to safely and effectively operate such a unit. Since the catalyst is not removed from the reactor there are no valves to be worn as is the frequent case in conventional fluidized bed operations. A further advantage of the single reactor wherein the catalyst is maintained in a fluidized state without the necessity of transfer to other contacting equipment is that high velocities usually needed to transfer catalyst are eliminated. Thus the reactor itself is less subject to wear. Another advantage of the present invention is much lower attrition rates for the catalysts. This reduces catalyst loss and maximizes the performance characteristics of the reaction system.

DESCRIPTION OF THE INVENTION

The objects and advantages of the present invention are achieved in a reactor that is comprised of a plurality of contacting sections, said sections being concomitant, the lower portion of said sections being connected and the upper portion being separated by walls or baffles.

The type of catalyst will depend on the particular reaction to be catalyzed. The present apparatus and process are applicable to the catalytic conversion of hydrocarbons, such as the dehydrogenation of hydrocarbons into corresponding hydrocarbons of lower hydrogen content, the reforming of naphthas, and gasoline fractions for improvement of their internal combustion engine fuel values, the aromatization of hydrocarbon oil fractions, the production of oxygenated hydrocarbon derivatives by controlled oxidation such as phthalic anhydride from naphthalene, the selective hydrogenation or partial hydrogenation of unsaturated hydrocarbons, and the dealkylation of alkyl-aromatic hydrocarbons, more particularly the preparation of mono or polymethylated aromatic hydrocarbons by removing alkyl groups of two or more carbon atoms in the presence of hydrogen, e.g., toluene from ethyl-propyl or butylbenzene.

The appropriate solid catalyst for the various reactions described here are known and available and form no part of the present invention. The present invention, however, is particularly suited to those catalysts which are highly refractory and capable of regeneration by treatment with an oxidizing gas stream at temperatures at which the carbonaceous contaminants are burned from the used catalyst and simultaneously therewith the activity is substantially restored. While activated, natural compositions such as activated montmorillonite, bentonite, kieselguhr and the like can be used as catalysts, synthetically prepared compositions comprising an oxidic base or carrier of relatively low activity and at least one metal compound as promoter or component of higher activity are preferred, such as for example, synthetic compositions of alumina or magnesia with one or more of the oxides of chromium, molybdenum, vanadium or iron or certain other metal oxides, for use in hydrocarbon reforming, aromatization, dehydrogenation, hydrogenation and dealkylation reactions contemplated herein and the compositions of silica with magnesia or with one or more of the oxides of aluminum and zirconium for catalyzing hydrocarbon cracking reactions.

In all of the embodiments described for the invention herein, the catalyst is maintained throughout the entire reactor in a fluidized state. The catalyst particles are transported from bottom of the reactor into which all of the upper reaction zones connect, in a random fashion; that is to say, some of the catalyst particles transported from the common bottom section of the reactor into a particular contacting zone may have just come from that zone or may have come from another zone and be appropriate for the particular zone. Because of the fluidized state there is a constant turnover in the catalyst particle population of any zone thus the net effect in regard to the catalyst distribution, i.e., the catalytic effect, in any zone or throughout the reactor is substantially the same as in the conventional circulating fluidized bed reactor. Thus the catalyst particles must be of such size that they can be continuously circulated within the unit without the aid of mechanical conveying means and they must be of such size as to permit the maintenance of the catalyst particles in a state of complete fluidization without the necessity of such excessive velocity as would give rise to erosion of the internal surfaces of the reactor. Generally the particles will be less than 4,000 microns, usually about 500 to 2,500 microns.

The total fluidized system can be composed of two or more distinct components. It is often the case that catalyst diluents are added to a fluidized system to improve heat distribution and catalyst performance. The diluents are considered as substantially inert solid materials of approximately the same size as the active catalytic components. The diluents can be present in substantial amounts, for example, up to 90 percent by volume. In dehydrogenation reactions for example, silicon carbide and α-alumina are used as diluents.

The structural parts and arrangements of the apparatus in accordance with the invention are principally the following: A vertical elongated shell which houses the upper contacting sections which are separated from each other by walls or baffles and a lower mixing section in vertical alignment and substantially unrestricted communication with each of the contacting sections. Inlet means are provided in the mixing section for the entry of the fluidizing gas which is a material that is inert in the various contacting sections. The inertness of any gas in the reactor will of course depend on the reaction to be catalyzed; however, nitrogen is a preferred fluidizing gas because of the large number of reactions in which it is inert or essentially so and its ready availability. Other gases that are generally inert are helium, argon, etc. Inlet means are also provided within each of said contacting sections for introducing the active vapors or gases into said contacting sections. The particle separating or vapor collecting means is provided in a top portion of each contacting section with vapor outlet means to permit withdrawing vaporous fluid from each of said sections and discharging the same therefrom. The present invention can best be described in regard to the figures.

Figure 1:
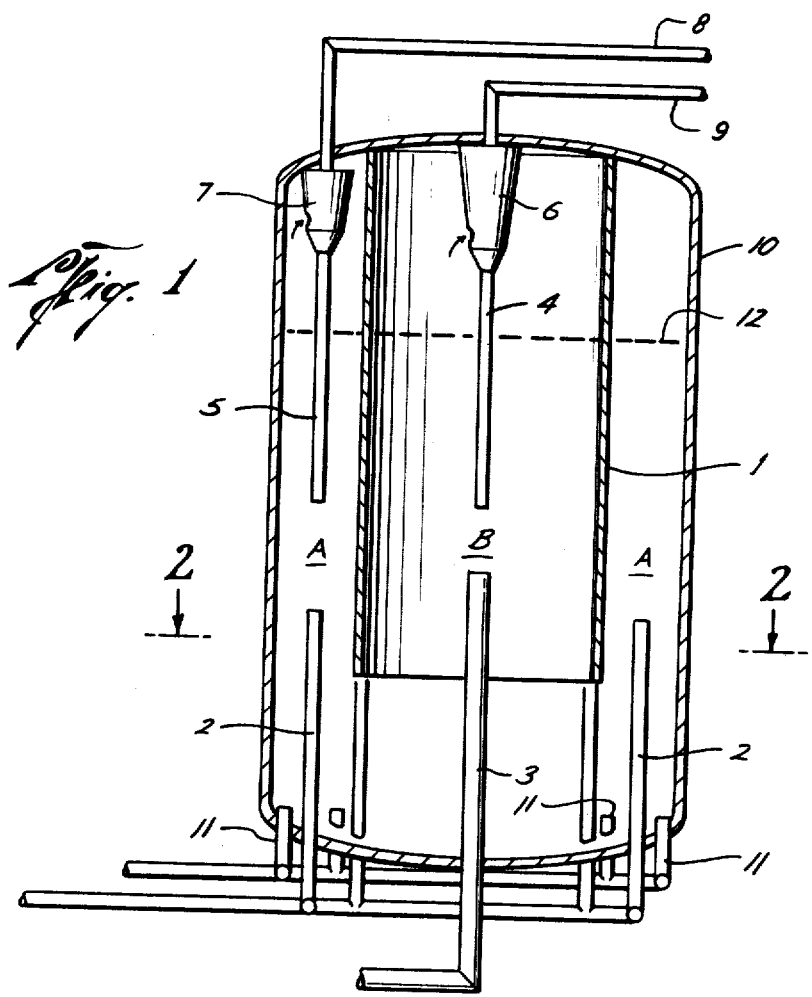
FIG. 1 shows a reactor of the present invention in one embodiment. In this case all of the reactive gases, regenerating gases and inert fluidizing gases are passed in through the piping at the bottom of the reactor.
Figure 2:
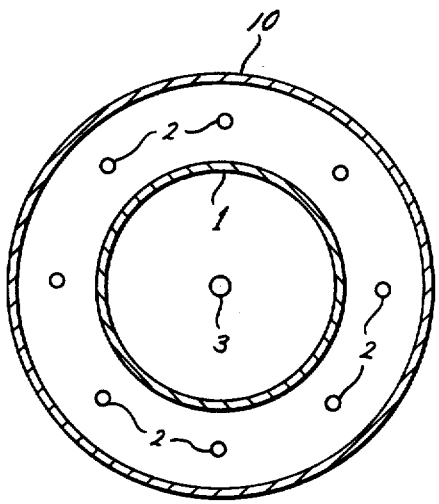
FIG. 2 shows a cross section at 2—2 of a cylinderical reactor of FIG. 1.
Figure 3:
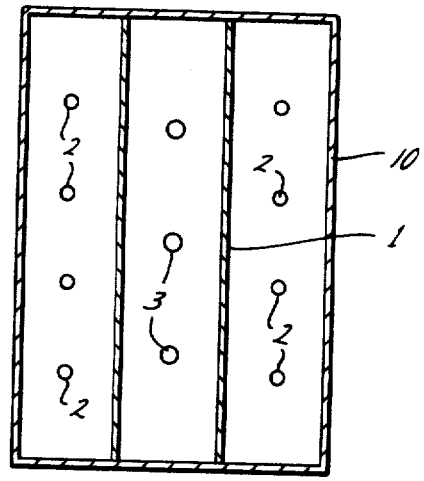
FIG. 3 shows a cross section at 2—2 of a rectangular reactor of FIG. 1.

The operation of this invention can be clearly seen from the following runs:

The reactor 10 shown in FIG. 1 has an elongated vertical shape with a circular cross section. For the purpose of simplification, the apparatus will be described with reference to a butane dehydrogenation operation. The catalyst, i.e., a chromia-alumina composition, is essentially the same as that employed in the so called Houdry Process which employs a fixed bed of chromia-alumina catalyst. That process is of necessity operated in a cyclic fashion, that is, dehydrogenation followed by regeneration of the catalyst with oxygen. The presence of regenerative quantities of oxygen in the reactor during the dehydrogenation will act as a catalyst poison and substantially reduce the conversion and selectivities of the reaction. As will be seen it is now possible to carry out that previously cyclic process in a continuous manner in the apparatus and process to be described. The catalyst particles have an apparent bulk density of about 63 pounds per cubic foot and a size of substantially from 60 to 200 mesh. Nitrogen passes into the reactor 10 through piping 11 and serves to fluidize the catalyst particles and maintains the fluidized bed 12, in the two zones or sections A and B. The two sections are created by the cylinderical wall 1 which runs from the top of the reactor 10 about three fourths of the way down the length of the reactor 10 thus causing section A to be concentric about section B. Sections A and B are connected across the lower portion below wall 1. The ratio of area of sections A to B can vary from about 5:3 to 2:1 and depends on the particular process and feed employed. In reactor 10 an area ratio of about 3:1 is employed and found satisfactory. n-Butane is fed into section B through piping 3 where it is commingled with the fluidized catalyst particles. The n-butane is converted principally to n-butenes and butadiene. By-product gases include hydrogen, ethylene and propylene. The off gases pass out of section B through the cyclone separator 6 and hence to a separating section (not shown) for recovery of the various products, by-products and unreacted n-butane. Entrained catalyst particles are returned to the fluidized bed via line 4. During the dehydrogenation process the catalyst particles become coked. In the past the spent or coked catalyst were sent to separate regenerators to have the coke burnt off with oxygen and then returned to the dehydrogenation zone. In reactor 10 however, the normal random flow of fluidized particles causes a portion of the spent catalyst to pass into the section of the reactor 10 below wall 1 and hence into section A where oxygen (usually in the form of air) is provided through piping 2 to burn off the coke and regenerate the catalyst particles. The off gases pass out through cyclone 7 and line 8 while entrained catalyst particles return to the fluidized bed through line 5. The off gases are principally $CO_2$, $CO$ and $N_2$.

The regenerated catalyst particles now pass in the same random manner as before into mixing section and hence into the dehydrogenation section B.

The temperature in the reactor will be about 600° C. The n-butane feed can be preheated (means not shown) or heat exchange means to the reactor can be provided to maintain the temperature, however, since the regeneration in section A is exothermic it is possible to control the temperature in the dehydrogenation B by controlling (means not shown) the rate of oxygen fed to section A. The rapid and frequent movement of the catalyst throughout the reactor 10 allows very accurate and responsive control of temperature in this manner.

Figure 4:
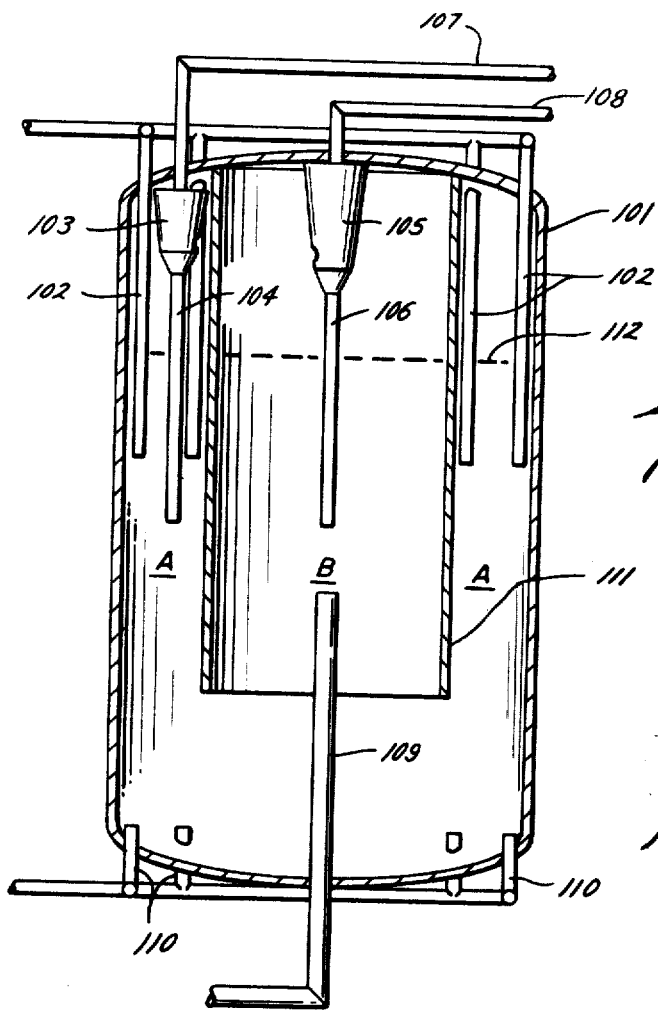
FIG. 4 shows another embodiment of the reactor wherein the gases in one section are added to the section from the piping at the top of the reactor.

Another mode of operation is shown in FIG. 4 which is a vertical elongated reactor having a circular cross section. The reactor is divided vertically into two contacting sections A and B by wall 111 which is circular, thus section B is surrounded by section A. A third section exists below sections A and B which section is in communication with sections A and B and can be described as a mixing or communicating section. The catalyst and feed are the same as described for FIG. 1. The fluidized bed is maintained at level 112 by nitrogen passing into the reactor 101 via piping 110. Section B is the dehydrogenation section and n-butane passes into section B through piping 109. The product and by-product gases pass out through cyclone 105 and line 108 while entrained catalyst particles drop back into the fluidized bed through line 106. The spent catalyst particles pass by random selection into the mixing section below from which all or a portion will ultimately find their way to section A which is the regeneration section by means of the random and continuous circulation of the particles in the fluidized bed. The spent catalyst is regenerated by burning off the coke with oxygen. The oxygen is added to section A by way of piping 102 which comes from the top of the reactor. Since the reactive vaporous material, in this case oxygen and n-butane, in sections A and B respectively, are not significant in the fluidization of the catalyst particles, said vaporous material can be injected into the fluidized bed from any point. The agitated state of the bed is sufficient to disperse and commingle the vaporous material and the catalyst. The off gases in section A pass out through cyclone 103 and line 107 while the entrained particles pass down line 104 into the fluidized bed.

The apparatus and process of the invention are also particularly suited for oxidative dehydrogenations such as those described in U.S. Pat. Nos. 3,420,911, 3,420,912, 3,428,703, and 3,440,299 which describe fluidized bed operations for the dehydrogenation of organic compounds, particularly hydrocarbons, using metal ferrites as the catalysts. The metal ferrite catalysts comprise crystalline compositions of iron, oxygen, and at least one other metallic element Me.

A preferred type of catalyst of this type is that having a face-centered cubic form of crystalline structure, for example, ferrites of the general formula $MeO . Fe_2O_3$ where Me is a divalent metal cation such as $Mg^{++}$ or $Ni^{++}$. Suitable catalysts may also be ferrites wherein other metals are partially substituted for the iron. For example, atoms having a valence of $+3$ may be partially substituted for some of the $Fe^{+++}$ atoms. Also, metal atoms having a valence of $+4$ may replace some of the $Fe^{+++}$ ions. Although the ferrite catalyst may be broadly defined as containing crystalline structures of iron, oxygen and the second metallic ingredient(s), certain types of catalysts are preferred. Valuable catalysts are those comprising as the main active constituent in the catalyst surface exposed to the reaction gases, iron, oxygen and at least one element selected from the group of Mn, or Periodic Table Groups IIA, IIIB or VIII. Preferred catalysts having iron present as the predominant metal in the catalyst exposed in the reaction gases and a metal selected from the group consisting of Mg, Ca, Sr, Ba, Mn, Cr, Co, Ni, Zn, Cd and mixtures thereof.

The catalysts may have the iron combined in crystalline structure with oxygen and more than one other metallic element, for example, a preferred type of ferrite is that essentially or approximately of the formula, $MeFe_2O_4$ where Me represents a divalent metal ion with an ionic radius approximately between 0.5 and 1.1 A., preferably between about 0.6 and 1.0 A.

Examples of ferrite catalysts are such as magnesium ferrite, cobalt ferrite, nickel ferrite, zinc ferrite, barium ferrite, strontium ferrite, manganese ferrite, calcium ferrite, cadmium ferrite, silver ferrite, zirconium ferrite, rare earth ferrites, such as cerium ferrite; mixtures of ferrites, such as magnesium ferrite plus zinc ferrite, magnesium ferrite plus nickel ferrite, magnesium ferrite plus cobalt ferrite, magnesium ferrite plus nickel ferrite plus zinc ferrite, magnesium ferrite plus manganese ferrite; chemical combination, such as magnesium zinc ferrite, magnesium chromium ferrite, zinc chromium ferrite and lanthanum chromium ferrite; and catalyst containing two second metallic ingredients having the basic formula $Me_aCr_bFe_cO_4$ where $a$ can vary within the range of about 0.1 to about 3, $b$ can vary from greater than 0 to less than 2 and $c$ can vary from greater than 0 to less than 3, and Me can be any of the metallic ingredients, other than chromium, previously described, particularly Periodic Table Groups IIA, IIB, III and VIII, such as Mg, Ba, La, Ni, Zn and Cd.

The ferrite catalysts may contain an excess of iron over the stoichiometric amount to form the ferrite, for example, about 10 to 20 percent excess. Similarly the catalysts may contain an excess of the Me over the stoichiometric amount required.

The process of this invention may be applied to the dehydrogenation of a wide variety of organic compounds. Such compounds normally will contain from two to 20 carbon atoms, at least one

grouping, a boiling point below about 350° C., and such compounds may contain other elements, in addition to carbon and hydrogen such as oxygen, halogens, nitrogen and sulfur. Preferred are compounds having two to 12 carbon atoms, and especially preferred are compounds of three to six or eight carbon atoms.

Among the types of organic compounds which may be dehydrogenated by means of the process of this invention are nitriles, amines, alkyl halides, ethers, esters, aldehydes, ketones, alcohols, acids, alkyl aromatic compounds, alkyl heterocyclic compounds, cycloalkanes, alkanes, alkenes, and the like. Illustration of dehydrogenations include propionitrile to acrylonitrile; propionaldehyde to acrolein; ethyl chloride to vinyl chloride; methyl isobutyrate to methyl methacrylate; 2 or 3 chlorobutene-1 or 2, 3 dichlorobutane to chloroprene;ethyl pyridine to vinyl pyridine; ethylbenzene to styrene; isopropylbenzene to α-methyl styrene; ethylcyclohexane to styrene; cyclohexane to benzene; ethane to ethylene or acetylene; propane to propylene, methyl acetylene, allene, or benzene; isobutane to isobutylene; n-butane to butene and butadiene-1,3; n-butene to butadiene-1,3 and vinyl acetylene; methyl butene to isoprene; cyclopentane to cyclopentene and cyclopentadiene-1, 3; n-octane to ethyl benzene and orthoxylene; monomethylheptanes to xylenes; ethyl acetate to vinyl acetate; 2, 4, 4-trimethylpentane to xylenes; and the like. This invention may be useful for the formation of new carbon to carbon bonds by the removal of hydrogen atoms such as the formation of a carbocyclic compound from two aliphatic hydrocarbon compounds or the formation of a dicyclic compound from a monocyclic compound having an acyclic group such as the conversion of propene to diallyl. Representative materials which are dehydrogenated by the novel process of this invention include ethyl toluene, alkyl chlorobenzenes, ethyl naphthalene, isobutyronitrile, propyl chloride isobutyl chloride, ethyl fluoride, ethyl bromide, n-pentyl iodide, ethyl dichloride, 1,3 dichlorobutane, 1,4 dichlorobutane, the chlorofluoroethanes, methyl pentane, methylethyl ketone, diethyl ketone, n-butyl alcohol, methyl propionate, and the like.

Suitable dehydrogenation reactions are the following: Acyclic compounds having four to five non-quarternary contiguous carbon atoms to the corresponding olefins, diolefins or acetylenes having the same number of carbon atoms: aliphatic hydrocarbons having six to 16 carbon atoms and at least one quarternary carbon atom to aromatic compounds, such as 2, 4, 4-triethylpentene-1 to a mixture of xylenes; acyclic compounds having six to 16 atoms and no quarternary carbon atoms to aromatic compounds such as n-hexenes to benzene; cycloparaffins and cycloolefins having five to eight carbon atoms to the corresponding olefin, diolefin or aromatic compound, e.g., cyclohexane to cyclohexene or cyclohexadiene or benzene; aromatic compounds having eight to 12 carbon atoms including one or two alkyl side chains of two to three carbon atoms to the corresponding aromatic with unsaturated side chain such as ethyl benzene to styrene.

The preferred compounds to be dehydrogenated are hydrocarbons with a particularly preferred class being acyclic non-quarternary hydrocarbons having four to five contiguous carbon atoms or ethyl benzene and the preferred products are n-butene-1 or 2, butadiene-1,3, vinyl acetylene, 2-methyl-1-butene, 3-methyl-1-butene,, 3-methyl-2-butene, isoprene, styrene or mixtures thereof. Especially preferred as feed are n-butene-1 or 2 and the methyl butenes and mixtures thereof such as hydrocarbon mixtures containing these compounds in at least 50 mol percent.

The maximum temperature during the dehydrogenation generally will be at least 250° C. such as greater than about 300° or 375° C., and the maximum temperature in the reactor may be about 650° or 750° C. or perhaps higher under certain circumstances. Suitable temperatures are within the range of about 300° to 650° C., such as from about 375° or 425° C. to about 600° to 650° C.

The total pressure during dehydrogenations may be atmospheric, superatmospheric or subatmospheric. However, relatively low pressures are entirely suitable, such as equal to or less than 100 p.s.i.g.

The contact time of the organic compound during dehydrogenation may be varied depending upon the particular process employed. It is an advantage of this invention that short contact times may be utilized such as less than 4 seconds and suitably less than 2 seconds such as from 0.005 to 1.9 seconds.

The following examples are presented to further demonstrate the operation of the present invention.

EXAMPLE 1

This reaction involves the dehydrogenation of n-butane using a chromiaalumina catalyst with the catalyst being regenerated by $O_2$. The catalyst was a mixture of 75 vol. percent chromia-alumina, Harshaw Cr-1404P (60–140 mesh) a commercial dehydrogenation catalyst and 25 vol. percent silicon carbide, Carborundum CEHF (60–140 mesh), a diluent. The n-butane was about 99 percent pure.

The apparatus used for this run was a bench scale Vycor reactor equivalent of that shown in FIG. 1. The reactor was about 30 inches long with a diameter of about 1.5 inches. Attached internally to the top of the reactor was a cylinder having a diameter of about 0.75 inch which extend downward about three-quarters of the length of the reactor. The n-butane feed came into the center section through a tube in the bottom of the reactor. The fluidizing gas, helium, entered through a tube that ended several inches below the internal cylinder and was concentric about the butane feed tube. The oxygen regenerating gas fed through three equally spaced tubes into the outer concentric section. The gas removal for each section was separate thus the product stream was not contaminated with the combustion gases from the regeneration section.

The mole ratio of n-butane/oxygen/helium was 1/1/3. The space velocity was 0.3 liter/min. of n-butane at STP. The temperature in the reactor was 567° C. and the run was continued for 6 hours. Conversion, selectivity and yield (C/S/Y, mole percent) was C = 52 percent; S = 81 percent -n-butenes(n-B), 7 percent butadiene (BD); Y = 42.1 percent n-B, 3.6 percent BD.

EXAMPLE 2

The same apparatus and catalyst as in Example 1 were used. $CO_2$ was used in place of $O_2$ in the regeneration. The molar ratio of n-butane/$CO_2$/He was 1/2/4, the space velocity was 0.25 liter/min. of n-butane at STP, the temperature was 570° C. and the C/S/Y (mole percent) was C=66 percent; S = 74 percent n-B, 7 percent BD; Y = 48.8 n-B, 4.6 percent BD.

EXAMPLES 3 AND 4

These examples employ the same apparatus and catalyst as Example 1, however, in Example 3, oxygen and n-butane were fed in a mixed stream. Example 4 was run in the same manner as Example 1. The mole ratio of n-butane/$O_2$/He for both examples was 1/0.4/4, the space velocity was 0.5 liter/min. of n-butane (STP). The temperature was 600° C. The results are in Table I.

TABLE I

| Example | Conversion | Mole % Selectivity n-Butenes | Bd. | Yield n-Butenes | Bd. |
|---|---|---|---|---|---|
| 3 (mixed feed) | 47 | 55 | 7 | 25.9 | 3.3 |
| 4 (split feed) | (a) 56 | 73 | 10 | 40.9 | 5.6 |
|  | (b) 56 | 67 | 9 | 37.5 | 5.0 |

(a) Product (dehydrogenation)gas stream only.
(b) Product (dehydrogenation) and combustion (regeneration) gas streams combined.

Example 3 shows the detrimental effect of oxygen on the dehydrogenation.

EXAMPLE 5

The apparatus in this example differs somewhat from that in Example 1 in that the regenerating gas is fed to the regeneration zone by a tube extending from the top of the reactor. The apparatus is a Vycor bench scale reactor equivalent to that shown in FIG. 4. In addition the fluidizing gas is fed in through two ports spaced equally between the outside wall of the reactor and the reaction gas inlet for the reaction (center) section. Approximately a 18 inch fluidized bed is maintained in the reactor.

This reaction n-butane was dehydrogenated with a mixture of 33 percent by volume chromia-alumina (Harshaw CR-1404P, 60–140 mesh) and 66 percent by volume silicon carbide (Carborundum CEHF, 60–140 mesh) the mole ratio of n-butane/air/$N_2$ was 1/1.5/2, the space velocity was 0.5 liter/min. n-butane at STP. The temperature was 600° C. The C/S/Y (mole%) was C=61 percent, S=71 percent n-B, 10 percent BD, Y=43.3 percent n-B, 6.1 percent BD.

EXAMPLE 6

Example 5 was repeated but 0.02 moles of $K_2O$ as $KNO_3$ was added to the chromia-alumina. The C/S/Y (mole percent) was C=63 percent, S=72 percent n-B, 9 percent BD, Y=45.4 percent n-B, 5.7 percent BD.

EXAMPLE 7

This example demonstrates an oxidative dehydrogenation according to the present invention. Fluidized oxidative dehydrogenations are described in U.S. Pat. No. 3,440,299 using a similar catalyst. The oxygen was not added to the dehydrogenation zone but was added by contacting the catalyst with air in the regenerating section. The catalyst serves as an oxidant, carrying the needed oxygen into the dehydrogenation zone. The same apparatus as in Example 5 was used. The feed was butene-2 (Bu-2) of about 97 percent purity. The mole ratio of Bu-2/Air/$N_2$ was 1/3/6. The space velocity was 0.25 liter/min. of Bu-2 at STP. The catalyst (60–140 mesh) was 40 vol. percent of a magnesium ferrite treated with 2 percent by weight of 85 percent phosphoric acid and 2 percent by weight boric-acid, and 60 vol. percent silicon carbide. The principal product was butadiene-1,3. Runs were made at two temperatures, the results are in Table II.

TABLE II

| Temp° C | C/S/Y Mole % |
|---|---|
| 450 | 81.5/94.5/77.0 |
| 470 | 97.5/90.5/88.2 |

EXAMPLE 8

The apparatus of Example 5 was used to dehydrogenate isobutane to produce isobutene. The mole ratio of isobutane/air/$N_2$ was 1/1.5/3, space velocity was 0.6 liters/min. of isobutane at STP. The temperature was 595° C. The catalyst was 25 vol. percent of chromia-alumina, 60–200 mesh, and 75 vol. percent α-alumina (Carborundum AEHF) 60–200 mesh. The conversion was 62 mole percent, selectivity for isobutene was 92 mole percent and the yield was 57.2 mole percent.

EXAMPLE 9

The same apparatus as Example 5 was used to dehydrogenate isopentane. The catalyst was 33 vol. percent Li modified chromia-alumina, 60–200 mesh, and 67 percent α-alumina, 60–200 mesh (BA-106, Norton). The mole ratio of isopentane-He/Air/$N_2$ was 1-1/3/3 (He was a diluent in isopentane feed) the space velocity was 0.5 liter/min. of isopentane at STP, at a reactor temperature of 575° C. The results are set out in Table III in mole percent.

TABLE III

| Conversion | Selectivity | | Yield |
|---|---|---|---|
| 47 | 3-methyl butene-1 | 5 | 2.4 |
|  | 2-methyl butene-1 | 22 | 10.3 |
|  | 2-methyl butene-2 | 36 | 16.9 |
|  | Isoprene | 15 | 7.1 |
|  | n-pentane | 1 | 0.5 |
|  | n-pentenes | 4 | 1.9 |
|  | pentadiene | 3 | 1.4 |

EXAMPLE 10

The same apparatus as in Example 5 was used for the dehydrogenation of n-butane to indicate time endurance. The conditions were:

| System |  | n-$C_4$-$N_2$/Air/$N_2$ |
|---|---|---|
| Mole ratio | (a) | 1-0/5.5/1.5 |
|  | (b) | 1-1/1/2.0 |
| Space Velocity | (a) | 3.24 Liquid Hourly Space Velocity |
|  | (b) | 2.16 Liquid Hourly Space Velocity |
| Temperature |  | 625° C. |
| Catalyst: |  | 25 vol. % Chromia-alumina (Hourly C) 60–200 mesh |
|  |  | 75 vol. % α-Alumina (Norton; BA 106) 60–200 mesh |

The results are shown below in Table IV.

TABLE IV

| ¹Conditions | Hours on Stream | ²C/ | S/ | Y |
|---|---|---|---|---|
|  |  |  | n-B+Bd | n-B+BD |
| (a) | 16 | 51 | 67+12 | 34.2+6.1 |
|  | 36 | 49 | 69+13 | 33.8+6.4 |
|  | 48 | 52 | 67+12 | 34.8+6.2 |
|  | 60 | 52 | 67+12 | 34.8+6.2 |
|  | 68 | 54 | 69+11 | 37.3+5.9 |
| (b) | 84 | 56 | 67+10 | 37.5+5.6 |
|  | 92 | 64 | 63+16 | 40.3+10.2 |
|  | 111 | 60 | 63+15 | 37.8+9.0 |
|  | 141 | 60 | 67+16 | 40.2+9.6 |
|  | 156 | 61 | 65+16 | 39.7+9.8 |

[1]The conditions were changed at 84 hours to increase butadiene production.
[2]Based on total effluent gases.

Catalyst losses in the 156 hours of continuous running were negligible amounting to only 3.57 percent.

While the present process has been described in greater detail in regard to hydrocarbon conversions, it should be appreciated that with suitable adjustments in operating conditions of temperature and time, it may be applied advantageously also to other reactions, such as for example, dehydration or controlled dehydrogenation of oxygenated hydrocarbon compounds. Among the reactions contemplated and performable at elevated temperatures with refractory catalysts, the following are exemplary: Vapor-phase dehydration of aliphatic alcohols to olefins in the presence of catalytic compositions such as silica with one or more of the compounds of alumina, zirconia, thoria and tungstia; vapor-phase dehydration of phenols with such similar catalysts, e.g., alumina-thoria; production of ketones from lower organic acids, e.g., acetone from acetic acid using a silica alumina catalyst; conversion of alcohols into ketones using steam and silica-thoria catalyst; and the preparation of aliphatic amines by the reaction of the corresponding alcohol vapor with ammonia in the presence of silica-alumina catalyst.

The invention claimed is:

A process for conducting catalytic reactions and regenerating catalyst in fluidized flow in a process carried out in a reactor consisting essentially of vertical shell housing a plurality of concomitant upper contacting sections which are separated from each other by walls extending from the top of the vertical shelf to a point in the lower portion of the shelf, but substantially above the bottom thereof, such that the upper contacting sections open into a common lower mixing section in vertical alignment and substantially unrestricted communication with each of the contacting sections, said upper contacting sections and said lower mixing sections containing solid catalyst particles, said process comprising 1. introducing an inert vaporous material to the bottom of said mixing section and passing said inert vaporous material upwardly through said lower mixing section and said upper contacting sections in sufficient amount to fluidize the catalyst particles in said lower mixing section and in said upper contacting sections,
2. introducing a vaporous organic compound to at least one of said upper contacting sections at a point above the lower edge of the walls which extend from the top of the vertical shell reactor and separate the upper contacting sections from each other, and passing said vaporous organic compound upwardly through these contacting sections,
3. withdrawing a gaseous mixture of inert vaporous material, vaporous organic compound and vaporous organic reaction product from the top of these contacting sections to which said organic vaporous compounds are introduced,
4. introducing a vaporous regenerating material to at least one of said upper contacting sections at a point above the lower edge of the walls which extend from the top of the vertical shell reactor and separate the upper contacting section from each other, and passing said vaporous regenerating material upwardly through these contacting sections,
5. withdrawing a gaseous mixture of inert vaporous material, vaporous regenerating product and vaporous regeneration material from the top of those contacting sections to which said organic regeneration material is introduced, whereby catalyst particles are continuously transferred from one upper contacting section to the common mixing section and then on to other upper contacting sections by the fluidization action of the fluidized bed resulting in a continuous transfer of catalyst particles back and forth between the upper contacting sections.

2. The catalytic process according to claim 1 wherein the catalyst particle size is less than 4,000 microns.

3. A fluidized bed reactor for contacting catalytic solids and vaporous reactive materials consisting essentially of a vertical elongated shell housing a plurality of concomitant upper contacting sections, said upper contacting sections being separated by walls extending from the top of the vertical shell to a point in the lower portion of the shell, but substantially above the bottom thereof, and a lower mixing section in vertical alignment and substantially unrestricted communication with each of the contacting sections, means for admitting vaporous fluidizing material at the bottom of the shell and substantially below the walls separating the contacting sections, means for admitting vaporous reactive material into each contacting section above the bottom of the walls thereof and means for removing vaporous products from each contacting section.

* * * * *

PO-1050
(5/69)

UNITED STATES PATENT OFFICE
CERTIFICATE OF CORRECTION

Patent No. 3,669,877                   Dated June 13, 1972

Inventor(s)    Heinz G. Friedrich

It is certified that error appears in the above-identified patent and that said Letters Patent are hereby corrected as shown below:

Column 4, line 2 reads "dehydrogenation B" but should read --dehydrogenation section B--.

Column 6, line 1 reads "6 to 16 atoms" but should read --6 to 16 carbon atoms--.

Column 6, line 46 reads "a chromiaalumina" but should read --a chromia-alumina--.

Column 8, line 55 reads "(Hourly C)" but should read --(Houdry C)--.

Signed and sealed this 6th day of February 1973.

(SEAL)
Attest:

EDWARD M. FLETCHER, JR.                    ROBERT GOTTSCHALK
Attesting Officer                          Commissioner of Patents